(No Model.) 5 Sheets—Sheet 1.

A. BLACKMER.
SAW SHARPENING MACHINE.

No. 352,802. Patented Nov. 16, 1886.

Witnesses
R. H. Sanford
L. E. Pierson

Inventor
Annie Blackmer
By R. C. Paul
Atty.

(No Model.) 5 Sheets—Sheet 3.

A. BLACKMER.
SAW SHARPENING MACHINE.

No. 352,802. Patented Nov. 16, 1886.

Witnesses
R. H. Sanford
L. E. Pierson

Inventor
Ammi Blackmer
By R. C. Paul
Atty.

(No Model.) 5 Sheets—Sheet 5.

A. BLACKMER.
SAW SHARPENING MACHINE.

No. 352,802. Patented Nov. 16, 1886.

Witnesses
R. H. Sanford.
A. M. Gaskell.

Inventor
Aumi Blackmer

UNITED STATES PATENT OFFICE.

AMMI BLACKMER, OF MINNEAPOLIS, MINNESOTA.

SAW-SHARPENING MACHINE.

SPECIFICATION forming part of Letters Patent No. 352,802, dated November 16, 1886.

Application filed June 19, 1886. Serial No. 205,624. (No model.)

*To all whom it may concern:*

Be it known that I, AMMI BLACKMER, of Minneapolis, in the county of Hennepin and State of Minnesota, have invented certain Improvements in Saw-Sharpening Machines, of which the following is a specification.

The invention relates to improvements in machines for grinding the teeth of saws.

The object that I have in view is to provide a machine in which the teeth of the saw may be ground straight across, or on a bevel in either direction, or may be given any desired hook shape.

The invention consists, generally, in a saw-sharpening machine having a vertically-moving grinding-wheel and horizontally and vertically moving slides for supporting the saw, that are carried by a horizontally-swinging plate whose axis is in a vertical line directly under the working part of the grinding-wheel.

The invention consists, further, in the constructions and combinations hereinafter described, and pointed out in the claims.

Figure 1:
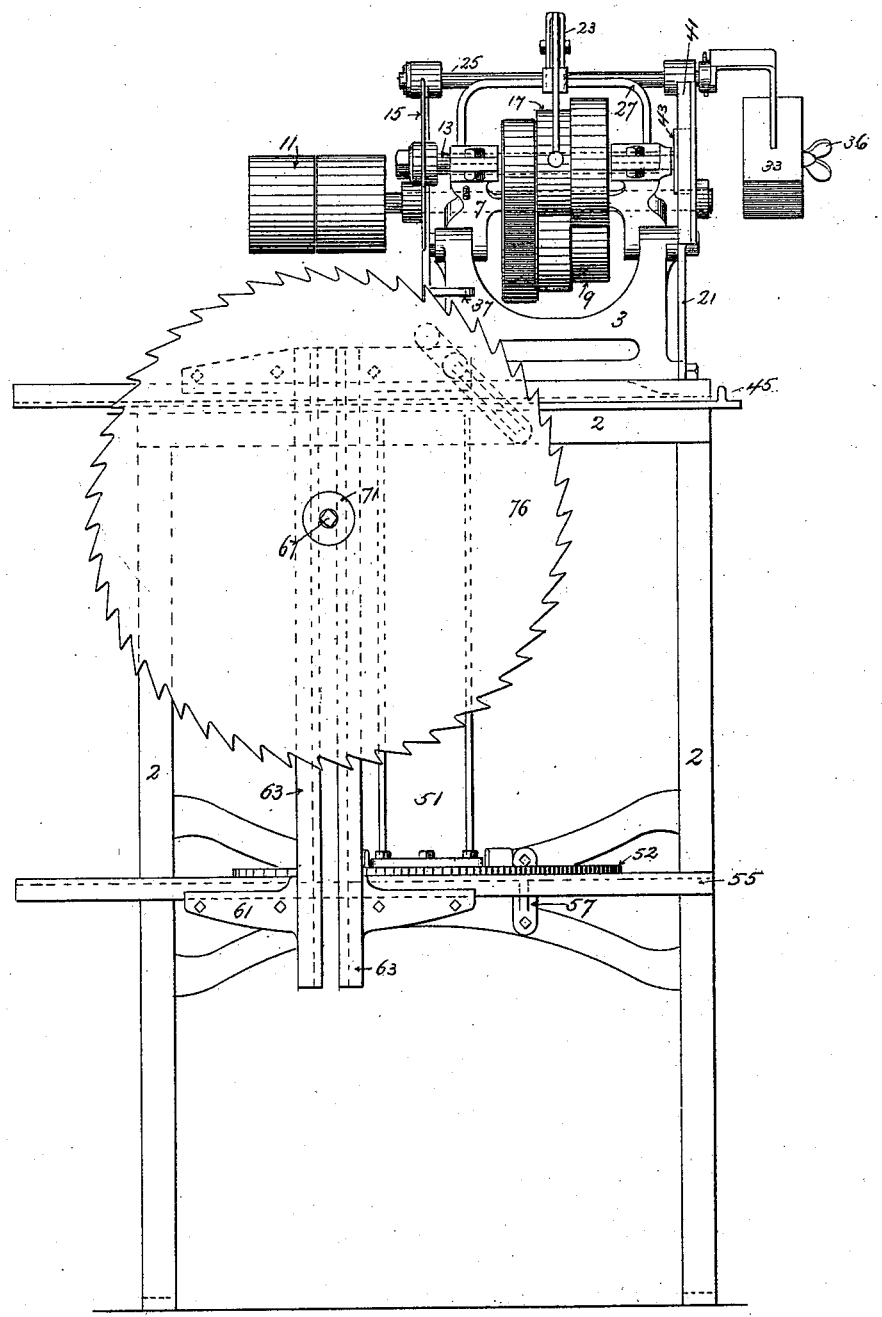
Figure 2:
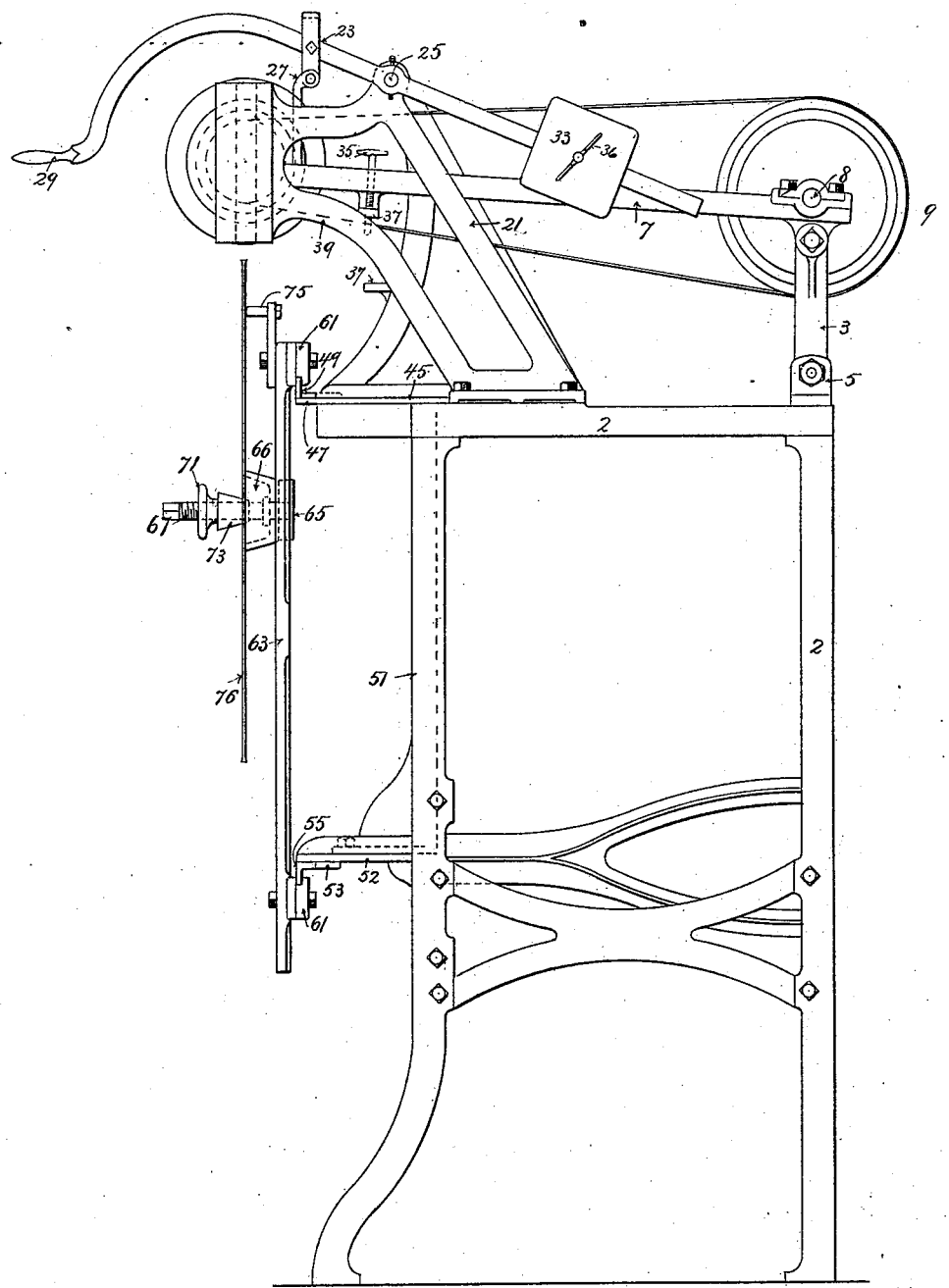
Figure 3:
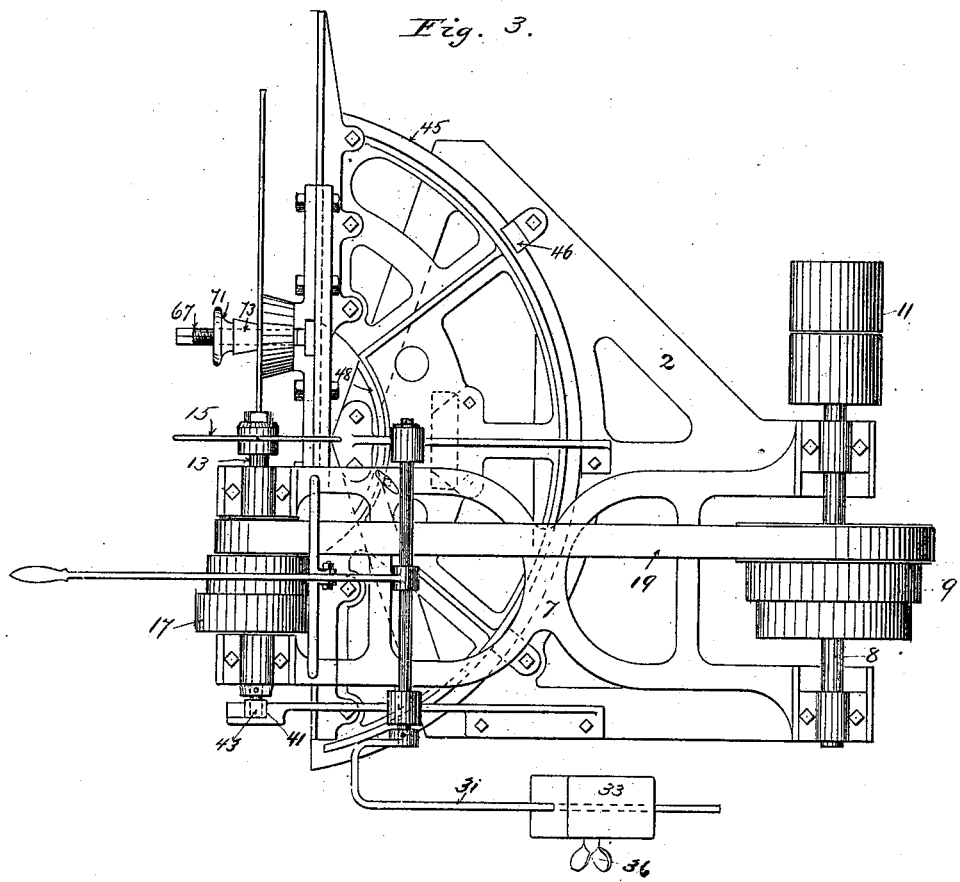
Figure 4:
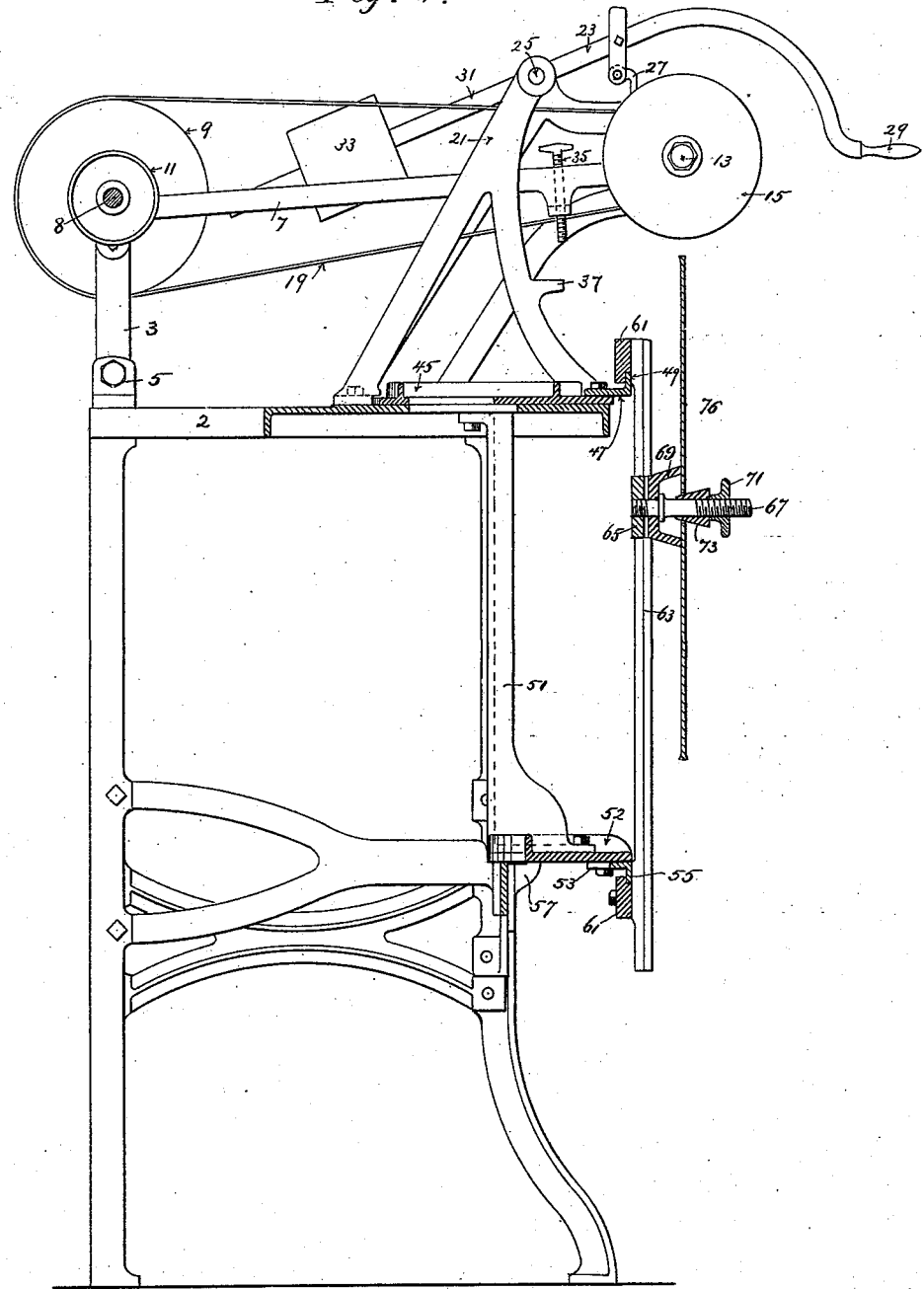
Figure 5:
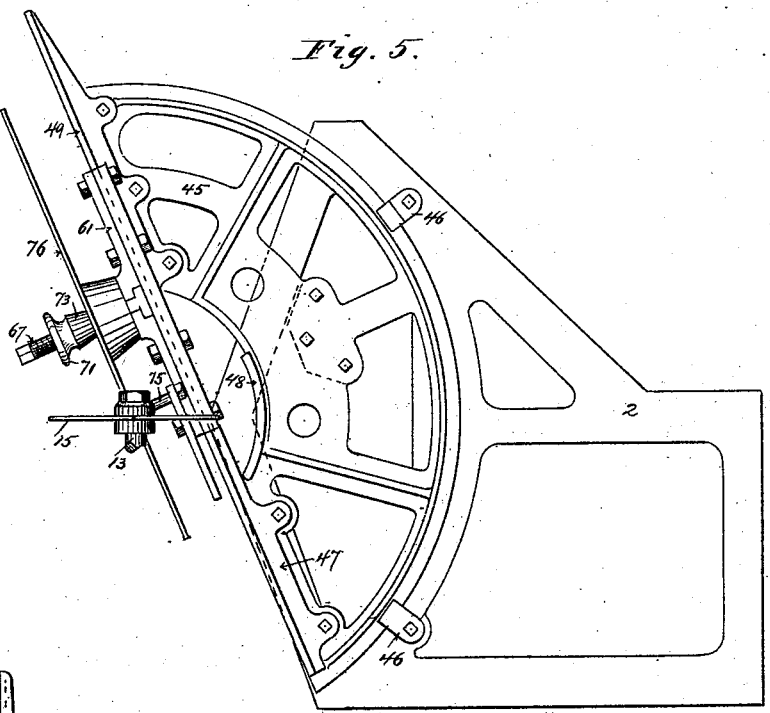
Figure 6:
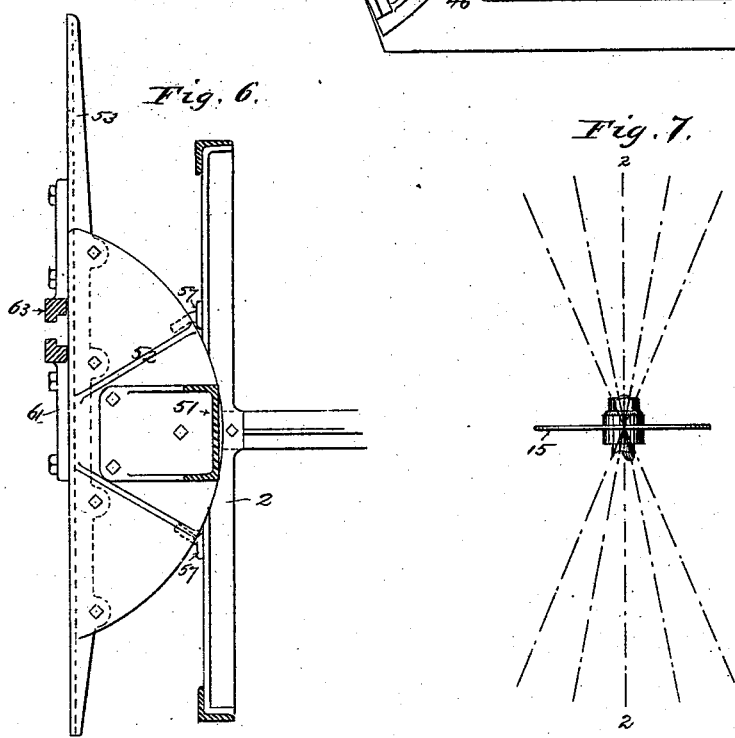
Figure 7:
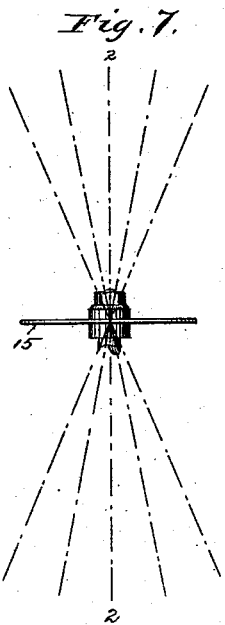

In the accompanying drawings, forming part of this specification, Figure 1 is a front elevation of my newly-invented machine. Fig. 2 is a side elevation of the same, and Fig. 3 is a plan. Fig. 4 is a vertical section of the machine, looking toward the right in Fig. 1, the section being taken through the saw-support. Fig. 5 is a plan of the machine with the means for supporting and driving the stone omitted. Fig. 6 is a partial plan section taken on a line above the plate $5^2$. Fig. 7 is a diagram illustrating the movement of the saw relatively to the position of the stone.

In the drawings, 2 represents the frame of the machine, which may be of any suitable construction. On the top of the rear part of the frame is a standard, 3, that is pivoted to suitable lugs or projections. A swinging frame, 7, is pivoted to the upper part of the standard 3, and extends to the forward part of the machine. At its rear end the frame is provided with a shaft, 8, upon which are the driving-pulleys 11 and the pulleys 9. A shaft, 13, is mounted in suitable bearings at the opposite end of the frame 7. This shaft carries the grinding-stone 15. It is also provided with the belt-pulleys 17. A belt, 19, passes from the pulleys 9 to the pulleys 17. The pulleys 9 are of various sizes, as are also the pulleys 17, and by this means the stone may be driven at any desired speed. A lever, 23, is secured to a short shaft, 25, that is mounted in standards 21 upon the frame 2. This lever is connected by a yoke, 27, with the frame 7. It extends in front of the machine, and has a suitable handle, 29. An arm, 31, is mounted on one end of the shaft 25. This arm is preferably bent substantially as shown in Fig. 3, and extends first in front of the shaft 25 and then to the rear thereof, substantially in the line of the lever 23. A sliding weight, 33, having a set-screw, 36, is mounted on the arm 31. This weight may be placed either in front or at the rear of the shaft 25. When it is at the rear of the shaft it counterbalances the weight of the stone and the frame 7. When it is in front of the shaft it holds the stone firmly down to its work.

The frame 7 is provided with a set-screw, 35, which is adapted to bear against a lug, 37, on one of the standards 21. This screw may be adjusted to determine the point to which the stone may be lowered, and consequently the depth of its cut. The standard 21 at the side of the frame opposite that on which the stone is mounted has a projecting portion, 39, in which there is a vertical groove or way in line with the shaft 13. The end of the shaft 13 carries a block, 43, that is arranged to slide vertically in the way 41.

The arrangement of the frame 7 and the pivoted standard 3 permits the forward end of the frame to move vertically in a direct line with the surface of the saw, and thus carry the stone in this direction as the lever 23 is operated.

Supported horizontally on the frame 2 is a plate, 45, which is held in position by lugs 46, that are bolted to the frame and extend over the edges of the plate. A curved lip or projection, 48, formed on or secured to the frame, engages the forward edge of the plate. The plate 45 is in the shape of a portion of a ring, and the axis about which it turns is directly under the center or working part of the wheel 15. Secured to the plate 45, and extending across the front of the machine, is a bar, 47, having an upturned edge or rib, 49. A similar bar, 53, having an oppositely-placed rib, 55, is arranged at some distance below the plate 45, and is connected with a plate, 52, which is concentric with the plate 45. The plates 45 and 52 are connected by a vertical post or standard, 51. A lug, 57, on the frame 2 forms a bearing for the plate 52, and also serves as a guide for the plate as it is turned. Upon the ways 49 and 55 I arrange the horizontal sliding bars 61. These slides are connected by a vertical plate, 63. The plate 63 has a vertical slot therein extending substantially its full length. A block, 65, having a screw-threaded opening in it is arranged in the slot of the plate 63. A bolt or stud, 67, is screwed into the block 65. The block 65 is on the back side of the plate 63. A hollow cone or block, 69, is mounted on the stud 67, on the opposite side of the plate 63, and projects into the slot in this plate, being thereby prevented from turning on the stud. A collar on the bolt 67 is seated in a recess in the block 69. The outer end of the bolt or stud 67 is rectangular or otherwise shaped to adapt it to receive a wrench by which the stud may be turned. The outer portion of the stud 67 is screw-threaded and adapted to receive a threaded hand wheel or nut, 71. A cone-shaped centering-block, 73, is provided for the stud 67, and can be projected in the hollow block 69 until the sides of the cone bear against the walls of the mandrel-hole and center the saw.

The forward portion of the frame 2 extends diagonally back in either direction from the center, substantially as shown in Figs. 3 and 5.

An adjustable rest, 75, is secured upon the upper slide, 61, and is adapted to be brought against the side of the saw near the point where it is being operated upon by the grinding-wheel.

The operation of the machine is substantially as follows: The hand-wheel 71 and centering-block 73 are removed from the stud 67. A circular saw, 76, is placed on the stud 67, and is centered by the block 73, which is placed on the stud and clamped against the saw by the hand-wheel 71. The slides 61 are then moved to bring the portion of the saw upon which it is desired to operate under the stone. The stud 67 is then vertically adjusted in the plate 63 until the saw is brought into the right position. If it is desired to grind straight across the teeth or to grind them to a hook shape, the plane of the saw is at right angles to the plane of the stone, as indicated by the dotted line 2 2 in Fig. 7. If it is desired to bevel the teeth, the plate 45 is turned upon its axis, thereby turning the saw until its plane extends diagonally across the plane of the stone at the desired angle for the bevel of the teeth, as indicated by the other dotted lines in Fig. 7. As the plate 45 turns about an axis that is in a vertical line through the working part of the stone, the saw which is carried by the plate is also turned about the same axis, and when the saw has been adjusted to the proper height it may be turned in either direction about this axis without carrying the portion that is beneath the grinding-wheel out of this position. (See Fig. 7.) This is an especial advantage, as after the saw has once been brought to the desired adjustment all of its teeth may be beveled (every other tooth being preferably beveled in opposite directions) without changing its vertical adjustment or changing the position of the slides 61. The teeth of the saw (whether they are square or beveled) are ground perfectly true for their entire length, the upper part or point being presented to the grinding-wheel in the same line as the lower part or throat, for the reason that the wheel and saw have the same relative position after being once adjusted, and, if so desired, all the teeth can be operated upon without changing the plane of the saw, (as would be done with a slitting-saw,) and each tooth will be the counterpart of the others. This result cannot be accomplished with any machine in which the plate upon which the saw is supported turns about an axis that is not in line with the center of the stone. The weight 33 is adjusted so as to counterbalance the weight of the frame 7 and the mechanism carried thereby. When the saw is brought into correct position the operator grasps the handle 29 and moves down the stone, bringing it into contact with the saw. The wheel is rapidly rotated through the pulleys and belts, the tooth is quickly brought to the desired shape, and the grinding-wheel is then raised enough to permit the saw to be turned to bring another tooth under the wheel. When the teeth are being beveled, the saw is placed at the desired angle and all of the teeth that are beveled alike are first ground. The plate 45 is then turned to bring the saw into position to give the other teeth the opposite bevel.

The set-screw 35 may be adjusted to serve as a stop to limit the depth of the throat.

When it is desired to joint the saw, the weight 33 is moved in front of the shaft 25, and the grinding-wheel is held down firmly with the stop 35 in contact with the lug 37. While in this position it may be used to cut the points of the teeth all off to the same length.

Any suitable grinding wheel or stone may be used. An emery or corundum is generally preferred.

The machine may be readily adapted for grinding other saws by substituting for the stud 67 suitable clamps or holding devices of any ordinary construction.

The pivoted lever connected to the swinging frame at a point forward of its fulcrum is an especially advantageous construction, as the weight of the frame and wheel may be easily counterbalanced, or may be brought entirely upon the wheel and surface being ground.

The use of the swinging standard 3 permits the forward end of the frame to move vertically without binding against one side of the way.

I claim as my invention—

1. The combination, in a saw-sharpening machine, of a grinding-wheel mounted in vertically-movable bearings, a movable plate arranged to turn about a vertical axis that is substantially under the center of the working part of said wheel, and saw-supporting devices secured to said plate, substantially as described.

2. The combination, in a saw-sharpening machine, of a grinding-wheel mounted in vertically-movable bearings, a movable plate arranged to turn about a vertical axis that is substantially under the center of the working part of said wheel, horizontally-movable slides supported on said plate, and a vertically-adjustable saw-supporting device supported on said slides, substantially as described.

3. The combination, with the grinding-wheel, of the plate 45, arranged to turn about an axis that is substantially central to said wheel, the horizontally-movable slide 61, supported on said plate, the plate 63, secured to said slide and having the vertical slot therein, and the vertically-movable stud or bolt 67, adapted to support a saw, all substantially as described.

4. The combination, in a saw-sharpening machine, of the pivoted standard 3, the frame 7, pivoted to said standard, a grinding-wheel mounted on said frame, and a stationary vertical way or guide with which said frame is connected, whereby said wheel is guided in a vertical direction, substantially as described.

5. The combination, with the swinging frame 7 and the grinding-wheel mounted thereon, of the shaft 25, supported in bearings on the frame of the machine, the lever 23, secured to said shaft, the yoke 27, connecting said lever with said swinging frame, the arm 31, and the counterbalance-weight 33, substantially as described.

6. The combination, in a saw-sharpening machine, with the frame 2 and standards 21, of the swinging frame 7, the grinding-wheel mounted thereon, the vertical way 41, supported by the standard 21, the block 43, secured to the shaft of the grinding-wheel and moving in said way, and the counterbalanced lever 23, pivoted to the standards 21 and connected with the frame 7 by a yoke, 27, substantially as described.

In testimony whereof I have hereunto set my hand this 1st day of June, 1886.

AMMI BLACKMER.

In presence of—
A. C. PAUL,
R. H. SANFORD.